United States Patent

[11] 3,539,152

[72] Inventor Harley D. Paul
Cabin N. Guthrie
Acres, Grass Valley,
Martinez, California 95945
[21] Appl. No. 744,071
[22] Filed July 11, 1968
[45] Patented Nov. 10, 1970

[54] SPARE TIRE HOIST
7 Claims, 5 Drawing Figs.
[52] U.S. Cl....................................................... 254/166,
254/186; 214/451; 224/42.22
[51] Int. Cl....................................................... B66d 3/00
[50] Field of Search........................................... 254/145,
150, 166, 186(HC); 214/451; 224/42.12, 42.21,
42.22; 74/548, 550

[56] References Cited
UNITED STATES PATENTS
1,983,767  12/1934  Mueller.......................... 214/451
2,524,508  10/1950  Barnes........................... 254/186(H.C.)
2,661,130  12/1953  Evans............................ 214/451
3,390,864  7/1968   Searcy........................... 254/166

Primary Examiner—Harvey C. Hornsby
Attorney—Clarence O'Brien and Harvey B. Jacobson ABSTRACT: A support structure adapted to underlie a body portion of a vehicle between the opposite sides thereof and including a winch mechanism operable from a perimeter portion of the vehicle to raise and lower a spare tire relative to the support structure. The winch mechanism includes a retractable drive crank which is automatically disengaged from the winch drum when shifted to the retracted position and engaged with the winch drum when shifted to the extended position and means is provided whereby the drive crank may be locked in an inoperative retracted position.

Patented Nov. 10, 1970 3,539,152

Harley D. Paul
INVENTOR.

BY Clarence A. O'Brien
and Harvey B. Jacobson
Attorneys

Patented Nov. 10, 1970 3,539,152

Harley D. Paul
INVENTOR.

BY Clarence A. O'Brien
and Harvey B. Jacobson
Attorneys

SPARE TIRE HOIST

The spare tire hoist of the instant invention has been primarily designed for use on pickup trucks and other load carrying vehicles although it is to be understood that it may also be utilized in conjunction with conventional passenger vehicles. Further, the structure of the spare tire hoist is such that its winch assembly may be mounted for rotation about a vertical axis as well as a horizontal axis as design of the vehicle with which it is to be used dictates and accordingly, the drive crank for the winch assembly may be shiftable in a generally horizontal path between retracted and extended positions and also shifted in a vertical path between retracted and extended positions, some modification of the embodiment of the hoist specifically illustrated and described hereinafter being required to orient the winch assembly for rotation about an upstanding or vertical axis. However, if the winch assembly is oriented for rotation about a vertical axis, its retractable drive crank may be disposed within the trunk compartment of an associated motor vehicle beneath which the support structure for the tire hoist is mounted.

The main object of this invention is to provide a spare tire hoist which may be utilized to conveniently store a spare tire beneath the body of an associated vehicle with the associated spare tire supported for raising and lowering relative to the vehicle between stored and readily accessible positions, respectively.

Another object of this invention is to provide a spare tire hoist in accordance with the preceding object constructed in a manner whereby it may be readily adapted for use in conjunction with substantially all types of motor vehicles.

Still another object of this invention is to provide a spare tire hoist including operative components thereof which are effectively shrouded or locked against tampering by unauthorized persons attempting to remove a spare tire supported therefrom.

A final object of this invention to be specifically enumerated herein is to provide a spare tire hoist in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
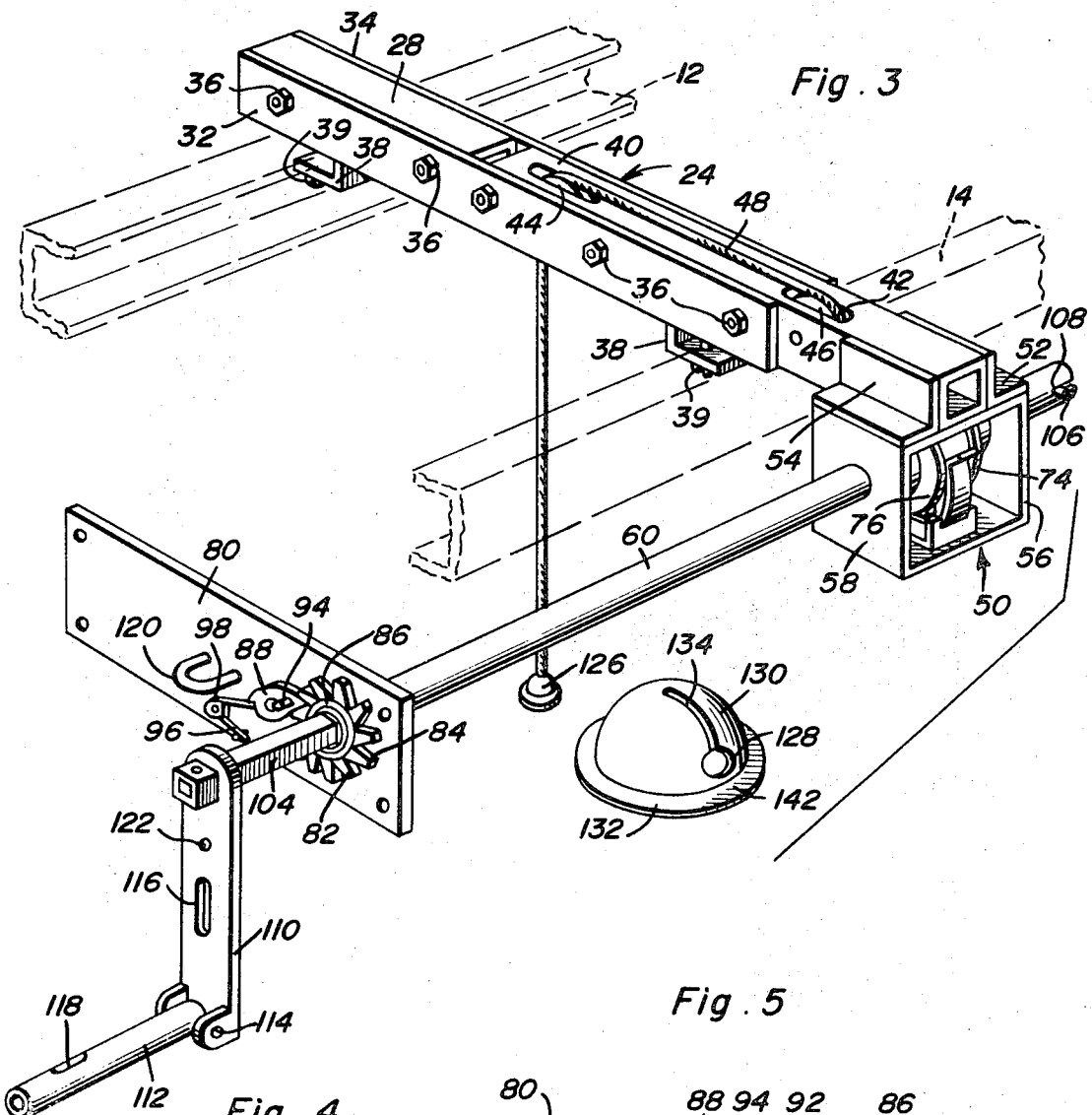
FIG. 3 is a view similar to FIG. 2 but with the operating or driving crank of the spare tire hoist in an extended operative position.
Figure 4:
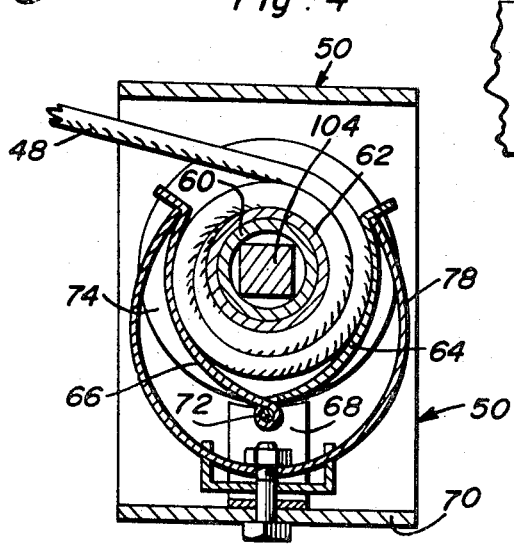
Figure 5:
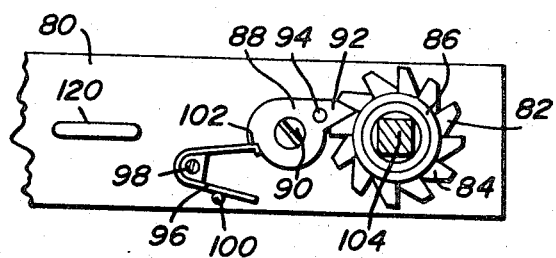

FIG. 4 is a fragmentary enlarged vertical sectional view taken substantially upon a plane passing through the center of the winch assembly and disposed normal to the axis of rotation of the winch assembly; and FIG. 5 is a fragmentary enlarged vertical sectional view taken substantially upon a plane disposed substantially normal to the ratchet wheel portion of the hoist and spaced slightly outwardly of the ratchet wheel as viewed in FIG. 3.

Referring now more specifically to the drawings the numeral 10 generally designates a conventional form of pickup truck including a pair of opposite side longitudinal frame members 12 and 14 from which a rear load bed 16 is supported. The load bed 16 is elevated relative to the frame members 12 and 14 and the truck 10 further includes a rear axle assembly referred to in general by the reference numeral 18 which extends transversely beneath the frame members 12 and 14 forwardly of their rear ends. In addition, the truck 10 includes a lower rear body panel 20 disposed slightly forwardly of and above the rear bumper 22 of the truck 10.

The spare tire hoist is generally referred to by the reference numeral 24 and includes a horizontal support member or structure referred to in general by the reference numeral 26. The support member 26 includes first and second aligned square tubular sections 28 and 30 secured between a pair of upstanding opposite side bracing plates 32 and 34 by means of suitable bolts 36 secured through the plate 32 and the sections 28 and 30 and threadedly engaged in the plate 34. The opposite ends of the plates 32 and 34 overlie the frame members 12 and 14 and a pair of lugs 38 are secured to the sections 28 and 30 by means of fasteners 39 and are utilized to clampingly secure the remote ends of the sections 28 and 30 to the frame members 12 and 14.

The tubular section 30 has a pair of upper slots 40 and 42 formed therein through which the upper peripheral portions of a pair of pulley wheels 44 and 46 journaled from the tubular section 30 project. The tubular section 30 includes lower openings (not shown) in general vertical registry with the slots 40 and 42 and an elongated flexible tension member 48 is trained over the pulley wheels 44 and 46 and depends downwardly from the pulley wheel 44 at its free end portion.

A winch drum enclosure referred to in general by the reference numeral 50 is supported from the end of the tubular section 30 remote from the tubular section 28 by means of suitable mounting brackets 52 and 54 and the enclosure 50 includes front and rear walls 56 and 58 through which the forward end of a tubular shaft 60 is journaled. The shaft 60 has a winding drum 62 mounted thereon for rotation therewith and a pair of arcuate guard plates 64 and 66 are pivotally supported from a bracket member 68 carried by the bottom wall 70 of the enclosure 50. The guard plates 64 and 66 are pivotally supported from the bracket member 68 as at 72 and extend upwardly to embrace the opposite sides of the winding drum 62 between the end flanges 74 and 76 thereof. The end portion of the tension member 48 trained over the pulley wheel 46 is wound about the winding drum 62 between the end flanges 74 and 76 and is at least partially enclosed between the guard plates 64 and 66 so as to be protected against dirt and water and an arcuate leaf spring 78 has its midportion supported from the mounting bracket 68 and its opposite ends are engaged with the free ends of the guard plates 64 and 66 to yieldingly urge them into frictional engagement with the portion of the tension member 48 wound upon the winding drum 62.

A face plate 80 is secured over the body panel 20 in any convenient manner such as by suitable fasteners (not shown) and the rear end of the tubular shaft 60 is journaled through the face plate and has a ratchet wheel 82 having teeth 84 thereon secured thereto in any convenient manner such as by welding 86. A ratchet dog 88 is pivotally supported from the face plate 80 by means of a pivot fastener 90 and includes a tooth portion 92 engageable between the teeth 84 and an outwardly projecting locking pin 94. A butterfly spring 96 is supported from the face plate 80 by means of a suitable fastener 98 and has one arm thereof abutted against a stop 100 carried by the face plate 80 and the free end of the other arm thereof seated in a notch 102 formed in the ratchet dog 88 whereby the butterfly spring 96 yieldingly urges the ratchet dog 88 to a position with its tooth portion 92 seated between adjacent teeth 84 of the ratchet wheel 82.

Figure 1:
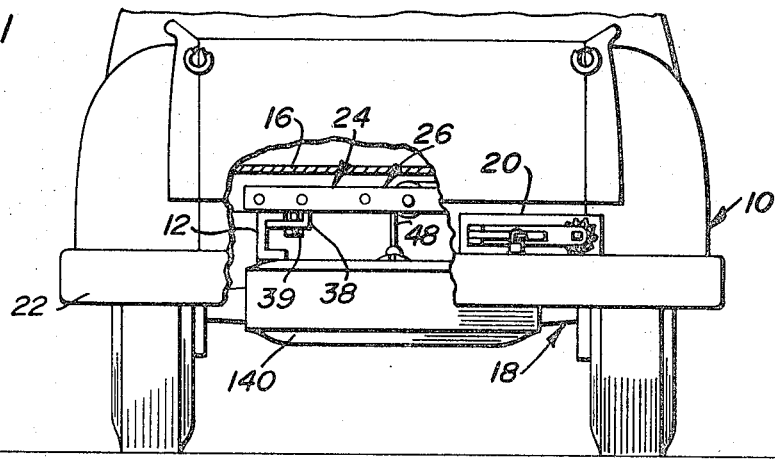
FIG. 1 is a fragmentary rear elevational view of a conventional form of pickup truck upon which the spare tire hoist of the instant invention has been mounted and with portions thereof being broken away and illustrated in vertical section so as to illustrate the operative position of the spare tire hoist relative to the associated components of the pickup truck.
Figure 2:
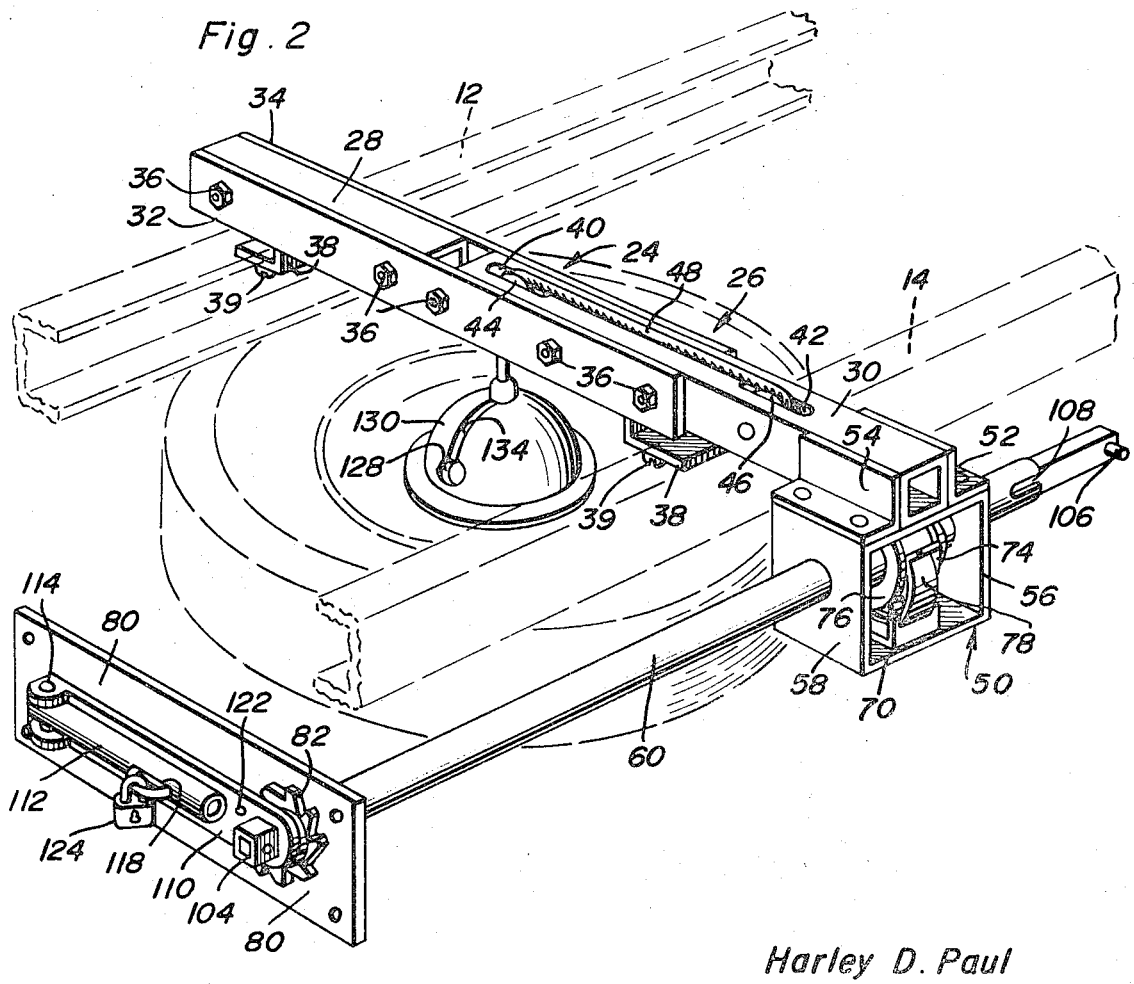
FIG. 2 is a perspective view of the spare tire hoist in operative association with the longitudinal frame rail of an associated vehicle, the frame rails being illustrated in phantom lines.

A drive shaft 104 is slidably and rotatably received through the tubular shaft 60 and includes a lateral projection 106 on its forward end which is receivable in an axially opening notch 108 formed in the tubular shaft 60 to key the drive shaft 104 to the tubular shaft 60. A platelike crank arm 110 is secured to the rear end of the drive shaft 104 and has one end of a tubular handle 112 pivotally secured to its free end portion by means of a suitable pivot fastener 114. Further, the crank arm 110 has a longitudinal slot 116 formed therein with which a longitudinal slot 118 formed in the handle 112 is registered when the handle 112 is pivoted to the inoperative position thereof illustrated in FIG. 2 of the drawings generally paralleling the crank arm 110. In addition, the face plate 80 has an outstanding U-shaped anchor member rigidly secured thereto receivable through the slots 116 and 118 when the handle 112 is in the inoperative position and the drive shaft 104 is in its forwardly displaced position illustrated in FIG. 2 of the drawings with the projection 106 shifted forwardly of the notch 108. Further, the crank arm 110 includes a horizontal bore 122 for receiving the outer end of the pin 94 when the crank arm 110 is positioned as illustrated in FIG. 2 of the drawings. Of course, from FIG. 2 of the drawings it may be seen that a conventional padlock 124 may be engaged with the anchor member 120 after the latter is received through the slots 116 and 118 in order to lock the crank arm 110, the handle 112 and the ratchet dog 88 in position.

The free end of the tension member 48 has a fitting 126 supported therefrom which is receivable through an opening 128 formed in a semispherical portion 130 of an adapter 132. The semispherical portion 130 includes a slot 134 extending from the opening 128 to the center portion of the semispherical portion 130 and the fitting 126 may be passed through the opening 128 and the portion of the tension member 48 immediately adjacent the fitting 126 is slidable through the slot 134.

In operation, after the support member or structure 26 has been suitably supported from the frame members 12 and 14 of the truck 10, the padlock 124 may be removed and the handle 112 may be pivoted toward the operative position thereof illustrated in FIG. 3. Then, the drive shaft 104 may be rearwardly displaced relative to the tubular shaft 60 in order to seat the projection 106 in the notch 108 and thereby couple the drive shaft 104 to the tubular shaft 60. At this time, if most of the tension member 48 is wound on the winding drum 62, the ratchet dog 88 may be pivoted in a counterclockwise direction as viewed in FIG. 5 of the drawings so as to shift the tooth portion 92 thereof out of engagement with the teeth 84 after which the handle 112 may be turned to lower the free end of the tubular member 48. On the other hand, after the ratchet dog 88 has been shifted out of engagement with the ratchet wheel 82, the drive shaft 104 may be forwardly displaced relative to the tubular shaft 60 so as to unseat the projection 106 from the notch 108 thereby freeing the tubular shaft 60 for rapid rotation and the tension member 48 will be free to unwind from the winding drum 62.

In order to support the spare wheel 140 from the spare tire hoist 24, the adapter 132 may be seatingly engaged with the center opening of the wheel 140 with the semispherical portion 130 projecting upwardly through the center opening of the wheel 140. Then, the fitting 126 may be passed through the opening 128 with the adjacent portion of the tension member 48 slidingly received in the slot 134. Of course, the horizontal flange portion 142 underlies the central areas of the wheel 140 defining the opening therethrough and accordingly, the wheel 140 is supported from the horizontal flange portion 142. Thereafter, the drive shaft 104 may be rearwardly displaced so as to engage the projection 106 in the notch 108 and thereafter the drive shaft 104 may be turned through the crank arm 110 and the handle 112 so as to wind the tension member 48 on the winding drum 62. This of course will elevate the spare tire or wheel 140 upwardly toward the support member or structure 26 until the opposite peripheral portions of the wheel 140 engage the undersurface portions of the frame members 12 and 14. Then, after the tension member 48 has been tightened, the ratchet dog 88 is allowed to seat between adjacent teeth 84 on the ratchet wheel 82 thus locking the tubular shaft 60 and winding drum 62 in position. Thereafter, the drive shaft 104 is forwardly displaced so as to unseat the projection 106 from the notch 108 and the drive shaft 104 is then rotated to a position such as that illustrated in FIG. 2 of the drawings before being shifted to its final forward position. Final movement of the drive shaft 104 and crank arm 110 to the forwardmost positions thereof will cause the anchor member 120 to be received through the slots 116 and 118 and the outer end of the pin 94 to be seated in the bore 122. Of course, the padlock 124 may then again be engaged with the anchor member 120 to retain the crank arm 110 and handle 112 in inoperative positions and the seating of the outer end of the pin 94 in the bore 122 will prevent the ratchet dog 88 from being shifted out of its operative position locking the tubular shaft 60 against rotation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A winch structure comprising a support, a winding member journaled from said support, an elongated flexible tension member having one end secured to said winding member for winding thereon, a torque input shaft journaled for rotation about an axis coinciding with the axis of rotation of said winding member and shiftable along said axis between first and second positions spaced therealong, said winding member and said shaft including coacting means drivingly connecting said shaft to said winding member when the shaft is in said first position and operative to allow free rotation of said winding member when in said second position, a ratchet wheel mounted on said winding member for rotation therewith, a ratchet pawl shiftable between operative and inoperative positions cooperating with said ratchet wheel releasably preventing rotation of said winding member in one direction, and means carried by said torque input shaft operatively associated with said ratchet pawl to lock the latter in said operative position when said torque input shaft is in said second position.

2. The combination of claim 1 including means operative to releasably lock said torque input shaft in said second position.

3. The combination of claim 1 wherein said support includes mounting means adapting said support to be supported from a motor vehicle, and the other end of said tension member including means adapted for removable attachment to a selected vehicle portion.

4. A spare tire hoist including a support member adapted for support from an under portion of a vehicle, a winding member journaled from said support and having one end of an elongated flexible tension member secured thereto for winding thereon, drive means shiftable between active and inactive positions and operable to drive said winding member when in said active position and allowing free rotation of said winding member when in said inactive position, said winding member being freely rotatable when said drive means is in said inactive position, a rotation preventing means including an actuator shiftable between operative and inoperative positions and operatively associated with said winding member preventing its rotation in one direction when said actuator is in said operative position and allowing free rotation of said winding member when said actuator is in said inoperative position, said drive means, when in said inactive position, being operative to retain said actuator in said operative position.

5. In combination with a vehicle, a support structure supported from said vehicle, a winding member journaled from said support structure, an elongated flexible tension member having one end secured to said winding member for winding thereon, the free end portion of said tension member depending downwardly between and below the lower marginal portions of said side rails generally centered therebetween, a spare wheel for said vehicle, the free end portion of said tension member including means securing the central portion of said wheel thereto, said tension member, upon being wound on said winding member, being operative to elevate said wheel toward said winding member, said winding member including a generally horizontally disposed shaft portion by which it is journaled extending toward and away from one peripheral marginal portion of said vehicle, a drive shaft journaled for rotation about an axis coinciding with the axis of rotation of said shaft portion and axially shiftable relative to the latter with one end thereof accessible from said one peripheral marginal portion of said vehicle for manual driving, said drive shaft and shaft portion including coacting means operable to drivingly connect said drive shaft to said shaft portion upon axial shifting of said drive shaft outwardly of said marginal edge portion to a first active position and to disconnect said drive shaft from driving relation with said shaft portion upon axial shifting of said drive shaft inwardly of said marginal edge portion to a second inactive position, and means operative to releasably lock said drive shaft in said inactive position.

6. In combination with a vehicle of the type including a pair of opposite side longitudinal side rails, a support structure secured between said side rails, a winding member journaled from said support structure, an elongated flexible tension member having one end secured to said winding member for winding thereon the free end portion of said tension member depending downwardly between and below the lower marginal portions of said side rails generally centered therebetween, a spare wheel for said vehicle having a pneumatic tire mounted thereon of a diameter at least slightly greater than the spacing between said side rails, the free end portion of said tension member including means securing the central portion of said wheel thereto, said tension member, upon being wound on said winding member, being operative to elevate said wheel into seated position with generally diametrically opposite portions of the upper side wall portions of said tire seated tightly against opposing undersurface portions of said opposite side rails, said winding member including a generally horizontally disposed shaft portion by which it is journaled extending toward and away from one peripheral marginal portion of said vehicle, a drive shaft journaled for rotation about an axis coinciding with the axis of rotation of said shaft portion and axially shiftable relative to the latter with one end thereof accessible from said one peripheral marginal portion of said vehicle for manual driving, said drive shaft and shaft portion including coacting means operable to drivingly connect said drive shaft to said shaft portion upon axial shifting of said drive shaft outwardly of said marginal edge portion to a first active position and to disconnect said drive shaft from driving relation with said shaft portion upon axial shifting of said drive shaft inwardly of said marginal edge portion to a second inactive position, ratchet means provided with an actuator shiftable between operative and inoperative positions and associated with said shaft portion preventing rotation of said winding member in a direction to unwind said tension member therefrom when said actuator is in said operative position and allowing free rotation of said winding member when said actuator is in said inoperative position, said drive shaft and actuator including coacting means operative to lock said actuator in said operative position when said drive shaft is in said inactive position and to free said actuator for shifting to the inoperative position thereof when said drive shaft is in said active position.

7. The combination of claim 6 including means operative to releasably lock said drive shaft in said inactive position.